(12) United States Patent
Jeon et al.

(10) Patent No.: US 8,380,506 B2
(45) Date of Patent: Feb. 19, 2013

(54) AUTOMATIC PATTERN RECOGNITION USING CATEGORY DEPENDENT FEATURE SELECTION

(75) Inventors: Woojay Jeon, Schaumburg, IL (US); Biing-Hwang Juang, Mableton, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 923 days.

(21) Appl. No.: 11/998,262

(22) Filed: Nov. 29, 2007

(65) Prior Publication Data

US 2008/0147402 A1 Jun. 19, 2008

Related U.S. Application Data

(63) Continuation of application No. PCT/ US2006/002983, filed on Jan. 27, 2006.

(51) Int. Cl.
*G10L 15/04* (2006.01)
(52) U.S. Cl. ........................................ 704/254; 704/231
(58) Field of Classification Search ........... 704/231–257
See application file for complete search history.

(56) References Cited

U.S. PATENT DOCUMENTS

| | | | | |
|---|---|---|---|---|
| 4,624,010 A * | 11/1986 | Takebayashi | ................. | 704/249 |
| 5,377,302 A * | 12/1994 | Tsiang | ........................... | 704/235 |
| 5,680,509 A * | 10/1997 | Gopalakrishnan et al. | ... | 704/240 |
| 5,754,978 A * | 5/1998 | Perez-Mendez et al. | ..... | 704/255 |
| 6,618,702 B1 * | 9/2003 | Kohler et al. | ................. | 704/250 |
| 6,836,758 B2 * | 12/2004 | Bi et al. | ......................... | 704/231 |
| 6,898,567 B2 * | 5/2005 | Balasuriya | .................... | 704/231 |
| 6,996,525 B2 * | 2/2006 | Bennett et al. | ................ | 704/231 |
| 7,054,810 B2 * | 5/2006 | Gao et al. | ........................ | 704/231 |
| 7,149,689 B2 * | 12/2006 | Yacoub | ........................... | 704/255 |
| 7,228,275 B1 * | 6/2007 | Endo et al. | ..................... | 704/235 |
| 2002/0128827 A1 * | 9/2002 | Bu et al. | ........................ | 704/222 |
| 2002/0143531 A1 * | 10/2002 | Kahn | ............................. | 704/235 |
| 2003/0110033 A1 * | 6/2003 | Sheikhzadeh-Nadjar et al. | ................ | 704/243 |
| 2003/0115053 A1 * | 6/2003 | Eide et al. | ...................... | 704/231 |
| 2003/0125940 A1 * | 7/2003 | Basson et al. | ................. | 704/231 |
| 2003/0139925 A1 * | 7/2003 | Anderson et al. | ............. | 704/231 |
| 2003/0144838 A1 * | 7/2003 | Allegro | .......................... | 704/233 |
| 2004/0122666 A1 * | 6/2004 | Ahlenius | ....................... | 704/231 |
| 2006/0173684 A1 * | 8/2006 | Fischer et al. | ................. | 704/254 |

OTHER PUBLICATIONS

Kuansan Wang; Shamma, S.A.; , "Spectral shape analysis in the central auditory system," Speech and Audio Processing, IEEE Transactions on , vol. 3, No. 5, pp. 382-395, Sep. 1995 doi: 10.1109/89.466657.*

* cited by examiner

*Primary Examiner* — Douglas Godbold
(74) *Attorney, Agent, or Firm* — Dustin B. Weeks, Esq.; Troutman Sanders LLP (57) ABSTRACT

Disclosed are apparatus and methods that employ a modified version of a computational model of the human peripheral and central auditory system, and that provide for automatic pattern recognition using category dependent feature selection. The validity of the output of the model is examined by deriving feature vectors from the dimension expanded cortical response of the central auditory system for use in a conventional phoneme recognition task. In addition, the cortical response may be a place-coded data set where sounds are categorized according to the regions containing their most distinguishing features. This provides for a novel category-dependent feature selection apparatus and methods in which this mechanism may be utilized to better simulate robust human pattern (speech) recognition.

20 Claims, 5 Drawing Sheets

Variance of cortical response for the vowels /iy/ and /uw/

Fig. 4b

Variance of cortical response for the fricatives /dh/ and /z/

Fig. 4c

Variance of cortical response for the affricates /jh/ and /ch/

Fig. 4d

Variance of cortical response for the plosives /k/ and /p/

AUTOMATIC PATTERN RECOGNITION USING CATEGORY DEPENDENT FEATURE SELECTION

CROSS-REFERENCE TO RELATED APPLICATIONS

This application is a continuation of International Application No. PCT/US06/02983, filed 27 Jan. 2006.

BACKGROUND

The present invention relates to pattern recognition apparatus and methods, and more particularly, to apparatus and methods that provide for automatic pattern recognition using category-dependent feature selection.

Machine listening systems often employ rudimentary simulations of the human auditory system to mimic human perception and cognition of sound. For example, in the case of speech recognition, the well-known Linear Predictive Coding (LPC) model spectrum is built on an all-pole model of resonances of the vocal tract, while the well-known Mel-Frequency Cepstral Coefficients (MFCC) are based on an approximation of critical bands. Most such front-end processing methods, however, are based on only crude approximations of the peripheral auditory system, with little or no consideration for latter stages along the auditory cortex where signal representations may undergo further transformations.

It was disclosed by R. Lippmann in "Speech recognition by machines and humans," Speech Communication, vol. 22, no. 1, pp: 1-15, March 1997, that automatic speech recognition systems perform far worse than human listeners under noisy conditions. Hence, while much research is aimed at developing functional approximations to human capabilities, there is an intense interest in building computational models that accurately and extensively mimic human physiology. Studying such physiological models may also lead to a better understanding of human audition, thereby offering the possibility of improved functional models.

Relatively recent developments discussed by K. Wang and S. A. Shamma in "Spectral shape analysis in the central auditory system," IEEE Trans. Speech and Audio Processing, vol. 3, no. 5, pp. 382-395, September 1995, for example, include simulations of the neural encoding of the primary auditory cortex (A1) in the central auditory system, as an extension to the peripheral auditory model developed in "Auditory representations of acoustic signals," IEEE Trans. Information Theory, vol. 38, no. 2, pp. 824-839, March 1992, by X. Yang, K. Wang, and S. A. Shamma. K. Wang et al. disclose that the one-dimensional auditory spectrum produced by the peripheral model is transformed into a three-dimensional, data-redundant response in the A1, which may encode auditory features that are relevant to perception and cognition in a more explicit, place-coded manner.

It would be desirable to have apparatus and methods that use such new, elaborate auditory models to improve upon conventional approaches and provide for automatic pattern recognition using category dependent feature selection.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

Table 1 shows the results of categorizing fifty English phoneme classes into twelve categories via an automatic clustering algorithm.

Table 2 illustrates speech recognition rates(%) using three different methods under varying Signal-to-Noise Ratio's (SNR).

DETAILED DESCRIPTION

Disclosed herein are pattern recognition apparatus and methods that utilize a dimension-expanded cortical response model as a representation of auditory signals. Apparatus and methods are also disclosed that provide for automatic pattern recognition using category dependent feature selection.

First, a description will be provided discussing an auditory model used in an implementation of the invention. The model has been validated under a conventional recognition framework by deriving speech features from the model and applying them to a phoneme recognition task. It has been found that the dimension-expanded cortical response is capable of providing speech features that are comparable to the MFCC in terms of recognition accuracy.

Next, a more new model of cognition and perception will be described that is based on observations of the auditory model that go beyond conventional methods of automatic speech recognition. By studying the dimension-expanded cortical response in connection with known physiological studies, an enhanced understanding of auditory physiology is provided, which provides for better functional and computational models for achieving more robust recognition and solves other auditory analysis problems. A novel method of categorization and category-dependent feature selection is described that is shown to result in improved speech recognition accuracy compared to conventional methods.

Overview of Auditory Model

Figure 3:
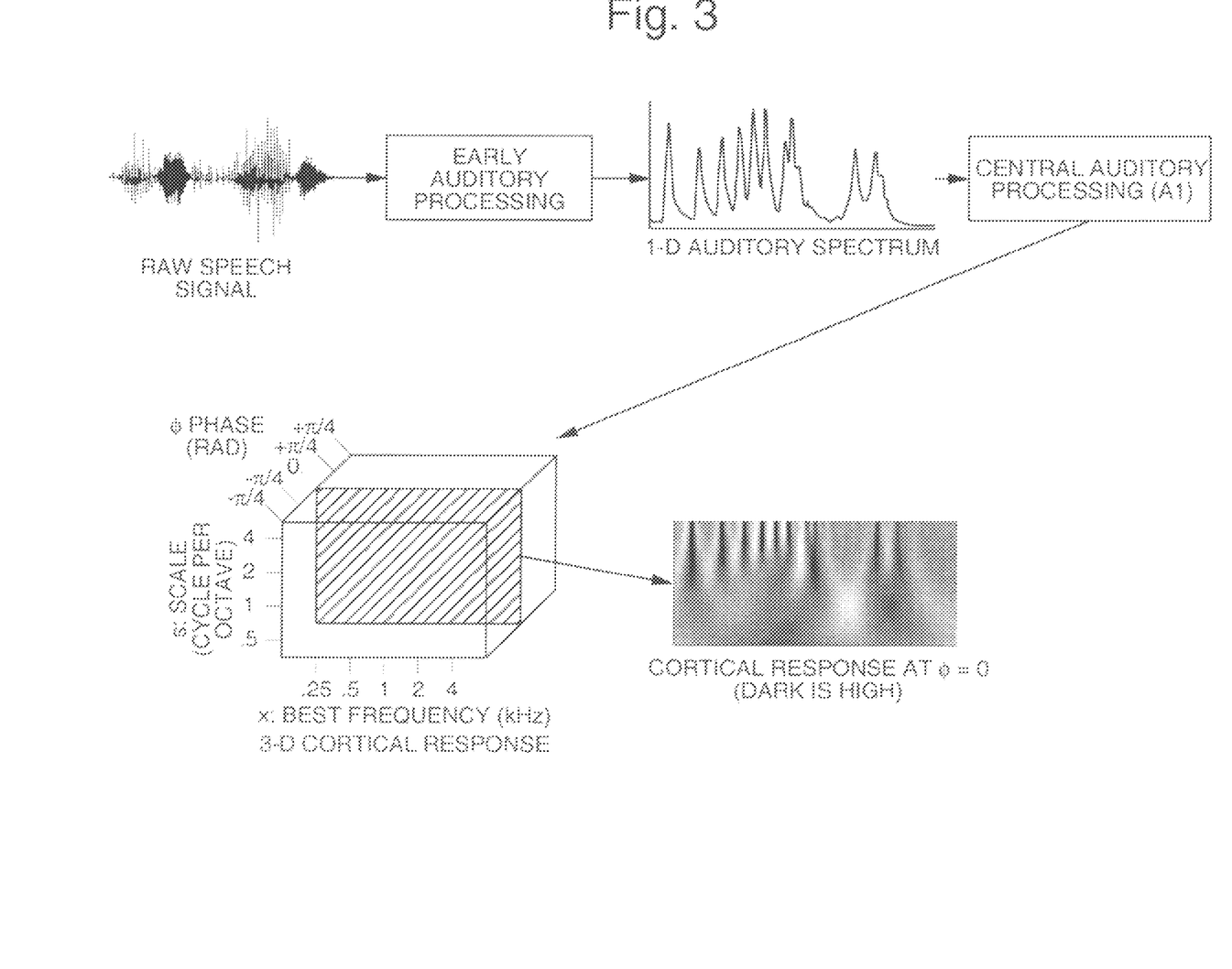
FIG. 3 illustrates the processing stages of the auditory model, showing an exemplary auditory spectrum and its cortical response for the vowel /aa/.
Figure 4A:
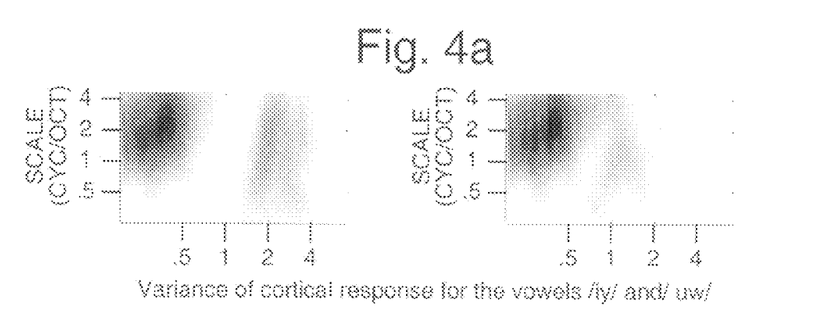
FIGS. 4a-4d illustrate the variance (dark=high) of the zero-phase plane in the cortical response for several different phonemes.
Figure 4B:
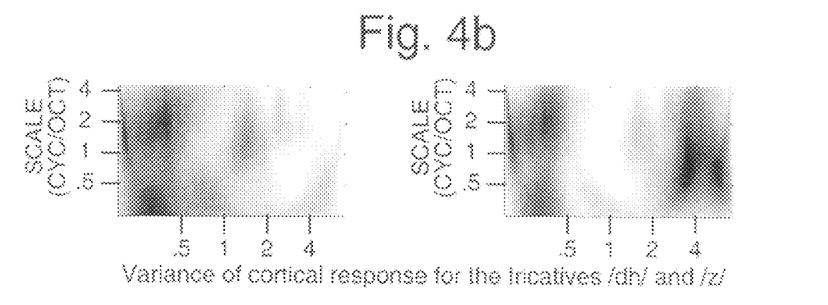
Figure 4C:
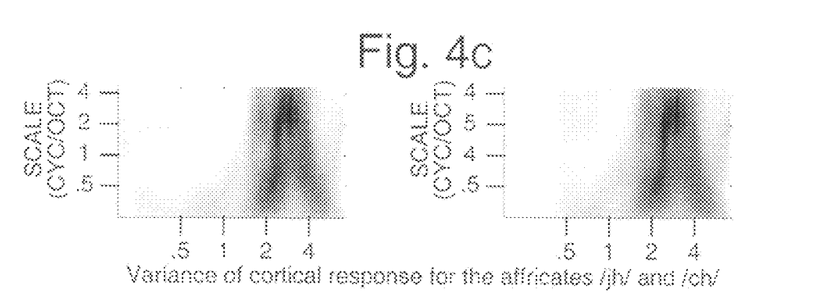
Figure 4D:
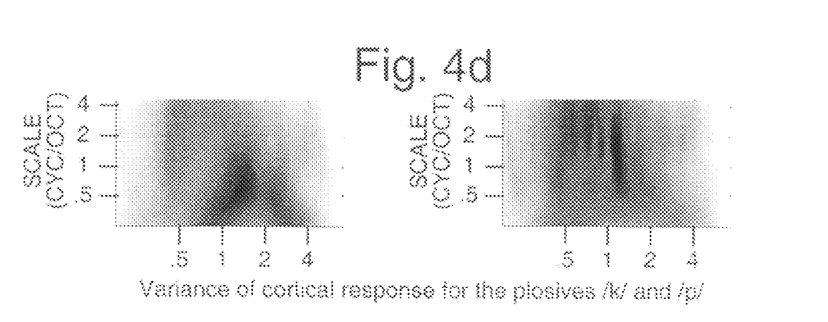

The auditory model used in the present apparatus and methods contains two processing blocks. The first is an early auditory processing block or function described in the Yang 1992 paper that takes a raw speech signal and transforms it into an auditory spectrum, as shown in FIG. 3. The auditory spectrum is similar to a conventional Fourier power spectrum, except that it is a result of more elaborate nonlinear processing stages simulating the peripheral auditory system and has certain features that are more relevant to human auditory perception, such as the enhancement of peaks and suppression of noise. The first stage is followed by a model of the primary auditory cortex (A1) in the central auditory system described in the Wang 1995 paper that transforms the one-dimensional auditory spectrum into a three-dimensional set of data called the cortical response. The cortical response is a numeric representation of the firing rates of neurons in the A1. Consider the three-dimensional box shown in FIG. 3 as the primary auditory cortex, the physical part of the brain that processes sound. The box is filled with neurons, each having a unique (x, s, φ) coordinate and its own firing rate. The example response shown in FIG. 3 indicates the firing rates of neurons on the plane shown in the box. A more specific description of the cortical response is provided in the following section.

Cortical Response

In the A1 model discussed in the above-cited "Spectral shape analysis in the central auditory system" paper, the one-dimensional auditory spectrum is redundantly encoded by a set of neurons, each neuron possessing a "response area" that characterizes the amount of excitation induced by spectral components along the tonotopic frequency axis. Each response, area is characterized by an excitatory range around the neuron's best frequency (BF) surrounded by inhibitory areas. The response areas are organized in roughly three dimensions: best frequency (BF), bandwidth (scale), and symmetry (phase). The bandwidth dimension indicates the overall stretch of the neuron's excitatory and inhibitory areas, while the symmetry indicates the difference in inhibition above and below the best frequency.

Figure 2A:
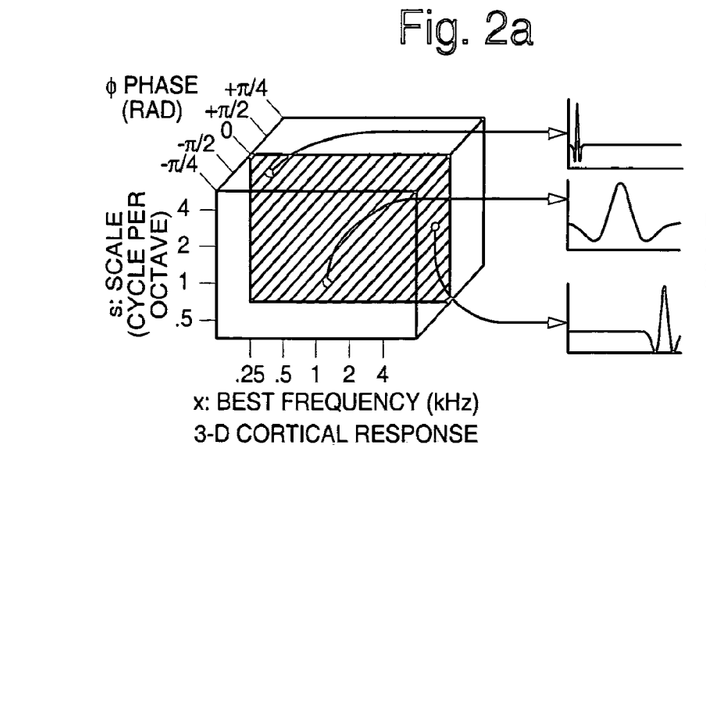
FIG. 2 illustrates the organization of neural response areas in the cortical response.
Figure 2B:
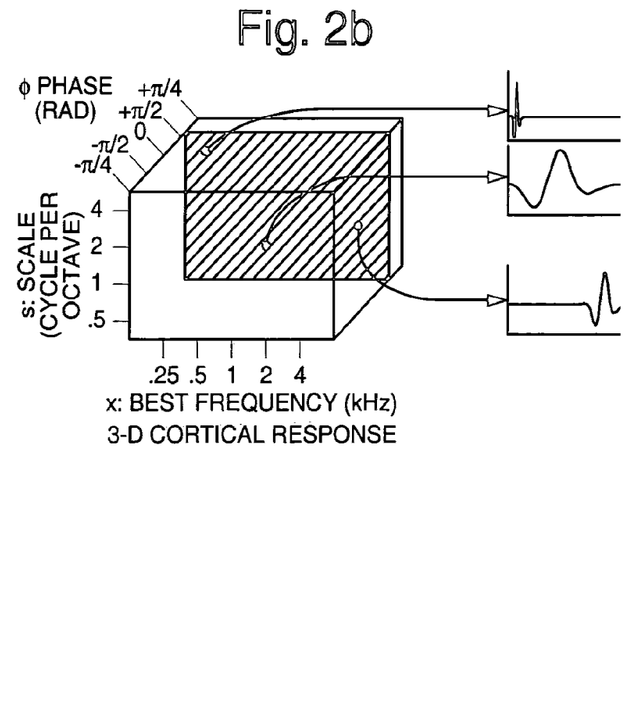

FIGS. 2a and 2b illustrate this concept. Again, the three-dimensional box can be seen as a physical representation of the primary auditory cortex. On the plane in FIG. 2a, where the phase is 0, all neurons have response areas that are perfectly symmetric, differing only by bandwidth and best frequency. The best frequency is the frequency to which the neuron is excited the most, and hence is where the response area is maximum. On the plane shown in FIG. 2b, the phase is π/4, in which case there is more inhibition below the best frequency than above it. Hence, the neurons on this plane have response areas that all have a deeper dip below the BF than above. When the phase is negative, the opposite occurs, i.e., there is more inhibition above the BF than below it.

To mathematically model these response areas, the "Spectral shape analysis in the central auditory system" paper proposes a seed analysis function $h_s(y)$ defined on the tonotopic axis y. A sinusoidal interpolation between $h_s(y)$ and its Hilbert Transform $\hat{h}y()$ models the varying symmetry, parameterized by φ. Although this construction allows efficient computation of the cortical response, it also has the effect of causing the peak of each excitatory lobe to drift away from the best frequency as |φ| increases. Hence, in the present implementation a small translation factor c(s, φ) is added to every analysis function to compensate for this deviation and align the excitatory peaks of all analysis functions to their best frequencies. The resultant cortical response becomes a more direct encoding of the local symmetry around each point on the auditory spectrum, allowing easier interpretation of visual plots. Mathematically, the analysis function on the tonotopic domain y parameterized by x (best frequency), s (scale), and φ (symmetry) can be written as:

$$w(y;x,s,\phi)=h_s(y-x+c(s,\phi))\cos\phi+\hat{h}_s(y-x+c(s,\phi))\sin\phi \quad (1)$$

The zero-scale correction factors c(0, φ) can be found by numerically solving the equation:

$$\frac{dw'(y;0;0;\phi)}{dy}=0 \quad (2)$$

for each φ, where w'(y; x, s, φ) is the same as w(y; x, s, φ) but without the alignment factor c(s, φ). The translation factor c(s, φ) is computed by dilating c(0, φ) as follows:

$$c(s,\phi)=\frac{c(0,\phi)}{a^s} \quad (3)$$

where α is the dilation factor discussed in the "Spectral shape analysis in the central auditory system" paper. Some examples of the resultant analysis functions for varying BF, scale, and phase are shown in FIGS. 2a and 2b. Also note that only the range $-\pi/2<\phi<+\pi/2$ is used for the symmetry axis in the model.

Once all response areas are computed, the cortical response r(x, s, φ) of a neuron located at the given coordinates in the 3-dimensional space is obtained by computing the inner product of its response area with the auditory spectrum p(y).

$$r(s,x,\phi)=\int_R p(y)w(y;x,s,\phi)dy \quad (4)$$

An example of the auditory spectrum and its cortical response is shown in FIG. 3 for the vowel /aa/.

Experimental Validation

To experimentally corroborate the validity of the cortical response as an auditory representation, a well-known dimension reduction method, Principle Component Analysis (PCA) discussed by R. O. Duda, P. E. Hart, and D. G. Stork, Pattern Classification, John Wiley and Sons, Inc., 2001, was used to derive feature vectors for use in a phoneme recognition task. Since the cortical response contains too much data for direct application of PCA, a simple method of data reduction is first applied by discarding regions that are found to have relatively high variance for all phonemes. This is based on the idea that responses in these locations are weakly correlated with the identity of each phoneme.

For example, FIGS. 4a-4d show the variance of the cortical response at the plane φ=0 illustrated in FIG. 3. It can be seen that the response for the vowels /iy/ and /uw/, for example, has high variance at the upper left regions. As discussed in the "Spectral shape analysis in the central auditory system" paper, responses in these regions are usually manifestations of pitch, which, naturally, is highly variant and does not contribute to discriminating between the actual identity of vowels. In the same manner, it is assumed that cortical regions that have overall high variance across all phoneme classes do not contribute much in distinguishing between the phonemes, and such regions are discarded from the cortical response. As a result, the data can be vastly reduced to a more manageable size where PCA can be more readily applied.

Recognition experiments were run using phonemes extracted from the well known DARPA TIMIT database (i.e., DARPA TIMIT Acoustic-Phonetic Continuous Speech Corpus). The phoneme folding method disclosed by K.-F. Lee and H.-W. Hon, "Speaker-independent phone recognition using hidden markov models," IEEE Trans. Acoust., Speech, Signal Processing, vol. 37, no. 11, pp. 1641-1648, March 1989, was used, excluding the group of closures, resulting in a total of 38 phonemes. Phoneme segments sampled at 16 kHz were taken from all "si" and "sx" sentences in the TIMIT database, resulting in a total of 82,881 total training phone samples and 30,335 testing samples. Clean data was used for training, while Gaussian white noise was added to the test data to vary the Signal-to-Noise Ratio (SNR).

The auditory model response included 128 channels on the tonotopic axis, 21 channels on the scale axis (with a resolution of 4.7 channels per octave), and 11 channels on the phase axis linearly spaced between $-\pi/2$ and $\pi/2$. Each raw feature consisted of 12 points, and frame-by-frame energies and delta and acceleration coefficients were appended to form 39-point vectors for the recognition task.

The recognizer was a 5-state HMM (3 emitting) implemented using HTK software with 32 Gaussian mixtures modeling the output probability of each state. Table 2 shows the recognition ratios achieved using the MFCC and the feature set derived from the AI response by the aforementioned procedure (indicated as "category-independent features"), under varying SNR (dB). The results show that the features derived from the auditory model give performance that is comparable to the MFCC, hence serving as a quantitative validation of the auditory model under existing recognition framework.

Category-Based Feature Selection Framework

One can notice that some phoneme classes can be grouped together to categories of phoneme classes according to the similarity of their low variance regions. In FIGS. 4a-4d illustrate, for example, such a grouping can be found with several phonemes categorized as vowels, fricatives, affricates, and plosives. One possible implication of this phenomenon is that the cortical response serves as a place-coded data set where phonemes sharing common characteristics have a common "identifying region" where their differentiating features are most strongly present. Hence, in order to detect the presence of a certain phoneme, one must analyze the identifying region pertaining to its category. This conjecture is consistent in some ways with studies reported by physiologists on the functionality of the auditory system. For example, evidence is disclosed in a paper by W. T. Siok, Z. Jin, P. Fletcher, and L. H. Tan, entitled "Distinct brain regions associated with syllable and phoneme," Human Brain Mapping, vol. 18, pp. 201-207, 2003, that distinct regions of the brain process syllables while others process phonemes. A paper by I. S. Johnsrude, R. J. Zatorre, B. A. Milner, and A. C. Evans, entitled "Left-hemisphere specialization for the processing of acoustic transients," NeuroReport, vol. 8, pp. 1761-1765, 1997, discloses that the left hemisphere of the brain may be specialized in processing acoustic transients. If this notion of specialization is extended to the processing of speech phonemes, it may be hypothesized that the cortical response includes distinct identifying regions that are specific to certain categories of phonemes, from which data can be extracted to make cognitive decisions. This processing is not limited to speech signals, but may include other complex audio signals in general. For example, different identifying regions may exist for different categories of musical instruments.

Hence, one may be able to make more effective use of the dimension-expanded cortical response by using category-based identifying regions to make cognitive decisions, a notion that sharply contrasts with conventional recognition methodology.

Figure 1:
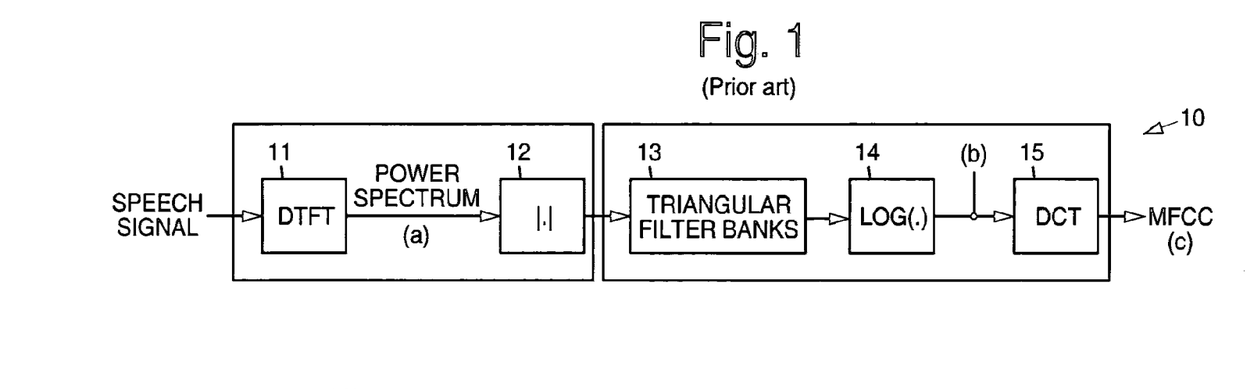
FIG. 1 illustrates conventional apparatus and processing that generates the Mel-Frequency Cepstral Coefficients (MFCC).
Figure 5:
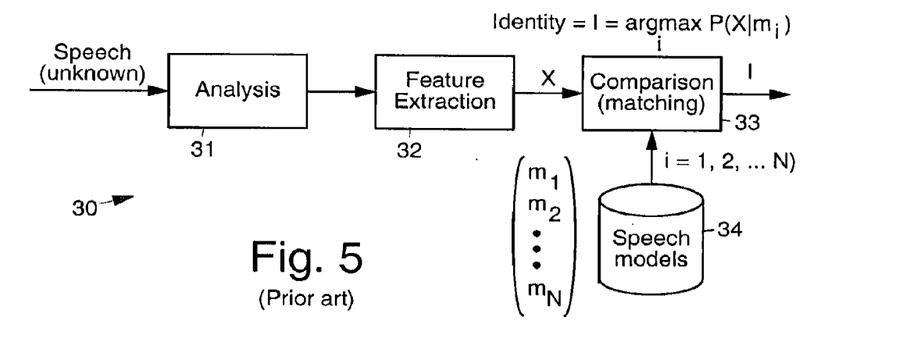
FIG. 5 illustrates a conventional phoneme recognizer.

Consider, for example, the conventional phoneme recognizer structure 30 in FIG. 5. This conventional phoneme recognizer 30 includes a spectral analyzer 31 that processes frames of unknown speech (on the order of 10 ms) to produce a vector of spectral values (say 256 to 512 points) for each time frame. The vector is processed by a feature extractor 32 that performs cepstral analysis using triangular integration, log, and FFT processing, followed by a data reduction procedure that retains a relatively small number (20-40) of features. Output of the feature extractor 32 is compared with speech models stored in a speech database 34. Note that in the conventional phoneme recognizer 30, the features are extracted and reduced uniformly through a single process. For example, in the feature extraction process for the well-known MFCC depicted in FIG. 1, all input signal go through a single process of transforming the raw signal to a set of features under hopes that the perceptual and cognitive information in all types of speech signals will be captured by the resulting feature vector.

Figure 6:
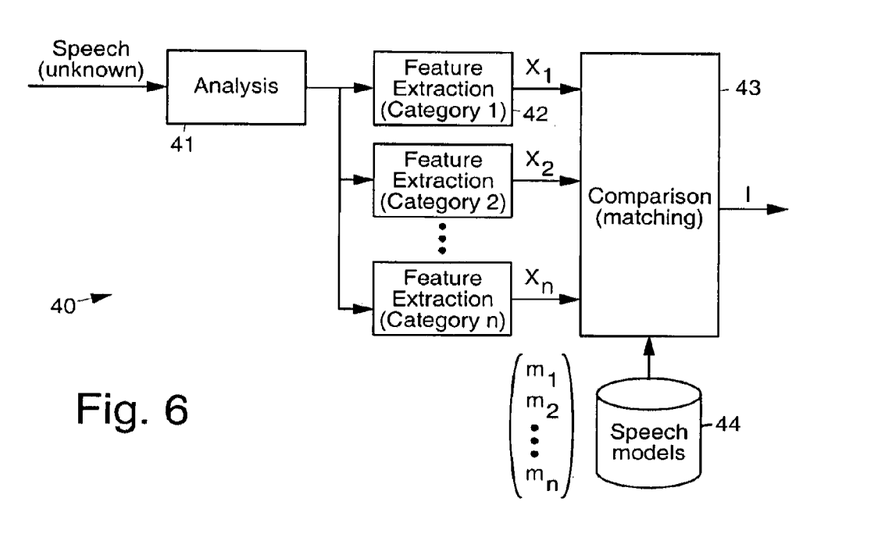
FIG. 6 illustrates a phoneme recognizer using feature extraction based upon characteristics of categories (collections of classes) of speech.

Compare this to the phoneme recognizer depicted in FIG. 6, where multiple feature extraction processes are employed, each process built on the characteristics of a category (collection of classes) of speech. This improved phoneme recognizer 40 comprises a spectral analyzer 41 that processes each frame of unknown speech to produce a vector of spectral values (say 28,160 points). A feature extraction block 42 for each category is then constructed, and a comparison scheme that can accommodate multiple feature sets and a corresponding set of speech models 44 is used to produce the final output. This recognizer takes into account the fact that processing of auditory signals by a person's brain is not uniform for all auditory input signals. Since physiological evidence indicates that different parts of the brain process different types of signals, this notion is extended to allow many different feature extraction processes to exist, each process specializing on a specific category of speech, such as vowels or consonants. This type of processing has not been done in conventional phoneme recognizers.

Figure 7:
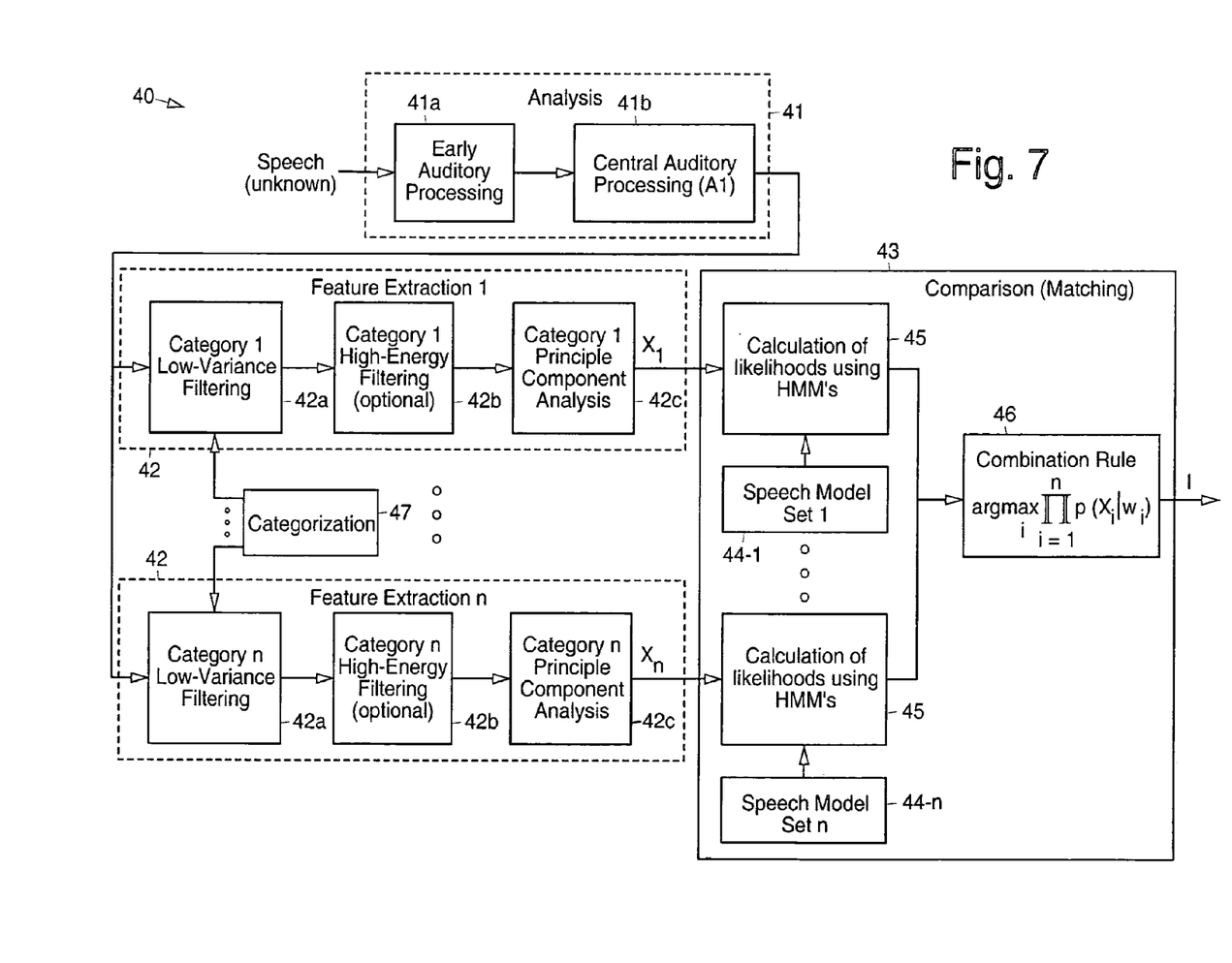
FIG. 7 illustrates an exemplary implementation of a phoneme recognizer of the type shown in FIG. 6.

FIG. 7 illustrates details of an exemplary implementation of a phoneme recognizer 40 based upon the concepts discussed with reference to FIG. 6. The phoneme categories are first identified via a categorization algorithm that clusters the speech classes based on the similarity of their variances in the cortical response. Detailed descriptions of the categorization and the category-dependent feature selection process used in this implementation will now be provided.

Categorization

For a phoneme class $w_i$, the variance of the neuron ë (the short hand notation ë=$\{x,s,\phi\}$ is adopted to represent the parameters that define the corresponding neuron's response area) is defined as $$\sigma_i^2(\square) = \frac{1}{|w_i|} \sum_{n \in w_i} \{r(\square) - m_i(\square)\}^2 \quad (5)$$

where $|w_i|$ is the cardinality of $w_i$ and the mean is $$m_i(\square) = \frac{1}{|w_i|} \sum_{n \in w_i} r(\square).$$

In the present implementation, these statistics were computed over the training data of the TIMIT database. To treat each phoneme class equally, the normalized variance is also defined as $$v_i(\square) = \frac{\sigma_i^2(\square)}{\max_{\square' \in U} \sigma_i^2(\square')} \quad (6)$$

where U is the set of all neurons. The following measure is defined to indicate the distance between two phoneme classes $w_m$ and $w_n$ in terms of their normalized variances.

$$d_{m,n} = \sum_{\square \in U} \{\log v_m(\square) - \log v_n(\square)\}^2 \quad (7)$$

The log function is applied as a practical way of emphasizing the low variances more than the high variances. For a category $C_j$ the intra-category distance, $\delta_j$, is defined as the sum of distances between all possible pairs (combined, not permuted) of classes contained in that category:

$$\delta_j = \sum_{w_m, w_n \subset C_j} d_{m,n} \quad (8)$$

Categorization is performed by first denoting each phoneme class as a category. At each iteration, a search is made for the two categories that, when combined, have the least intra-category distance, merging them into a single category. The procedure is repeated until an arbitrary number of categories is obtained. Table 1 shows the categorization of 50 phoneme classes obtained using this iterative method. It is interesting to note that much of the grouping also makes intuitive sense, such as the tendency of vowels and consonants to be separated.

TABLE 1

| No. | Phonemes |
|---|---|
| 1 | b, p, hh, ax-h |
| 2 | d, t, g, k |
| 3 | dx, hv, f, dh, th |
| 4 | v, em, ng |
| 5 | jh, s, sh, ch |
| 6 | z, zh |
| 7 | y, iy, ux, ih, ey |
| 8 | m, n, en, nx, ix |
| 9 | l, el, w |
| 10 | aa, ao, ow, oy, uw |
| 11 | ay, aw, eh, ae, ax, ah, uh |
| 12 | r, axr, er |

Category-Dependent Feature Selection

For each category obtained via the aforementioned categorization process, a low-variance filter is constructed by identifying those neurons that generally exhibit low variance for the phoneme classes belonging to the category. A simple method of identifying these neurons is to take the sum of the class-wise variances and finding those neurons with sums below some threshold.

$$\text{Set of low-variance neurons for Category } j = \quad (9)$$
$$\left\{ \lambda \text{ for which } \sum_{w_i \subset C_j} v_i(\lambda) < \tau_v \right\}$$

The low-variance filter is set to discard all those neurons that exhibited high variance, and allow only low variance neurons to pass through, where variance is defined in Equation (6).

An optional high-activation filter can be used immediately after the low-variance filter to additionally restrict the neurons such that only neurons with high average activation for signals pertaining to the corresponding category to pass, discarding all other neurons. This idea is based on the fact that neurons with high average activation for clean signals tend to be noise robust, as discussed by W. Jeon, et al. in "Separation of SNR via dimension expansion in a model of the central auditory system," to be presented in IEEE ICASSP 2006.

Average activation of neuron ë for class $w_i$ is defined as the average absolute response as follows:

$$\mu_i(\square) = \frac{1}{|w_i|} \sum_{r \in w_i} |r(\square)| \quad (10)$$

Similar to the variances, the normalized average activation may be defined as:

$$u_i(\square) = \frac{\mu_i(\square)}{\max_{\lambda' \in U} \mu_i(\square')} \quad (11)$$

This results in:

$$\text{Set of high-activation neurons for Category } j = \quad (12)$$
$$\left\{ \lambda \text{ for which } \sum_{w_i \subset C_j} u_i(\lambda) > \tau_u \right\}.$$

Principle Component Analysis (PCA) is then performed on the filtered set of neurons to further reduce the features to a number that can be readily used in a conventional speech recognizer. The low-variance filter, optional high-activation filter, and PCA mean vectors and eigenvectors are obtained using uncorrupted training data pertaining to the given category, then applied from that point on to all arbitrary input data for the training of the HMM's and the recognition of test data.

Example Phoneme Recognizer Using Category-Dependent Feature Selection

In FIG. 7, the exemplary phoneme recognizer 40 comprises a spectral analyzer 41 that includes early auditory processing 41a, such as is described by X. Yang, et al. in "Auditory representations of acoustic signals," cited above, for example, followed by central auditory processing (A1) 41b, such as is described by K. Wang et al. in "Spectral shape analysis in the central auditory system," cited above, or by W. Jeon in "A study of auditory modeling and processing for speech signals," for example.

The spectral analyzer 41 is followed by a plurality of parallel feature extractors 42. Each of the feature extractors 42 process auditory signals output by the spectral analyzer 41 for an individual category of auditory signals. The respective feature extractors 42 each comprise a low-variance filter 42a followed by an optional high-activation filter 42b and a principle component analyzer 42c. Categorization 47 is implemented by way of a separate categorization process 47 or function 47.

For each category n, the low-variance (and high-activation) filters and the mean vectors and eigenvectors for the principle component analyzer 42c are obtained from training samples belonging to classes in category n. The filters and eigenvectors are then applied to all training data to obtain Speech Model Set n (models are created for all phoneme classes).

For all test data, outputs of the feature extractors 42 are input to a comparison matcher 43, which comprises a plurality of likelihood calculators 45 that respectively process outputs $(X_1, \ldots X_n)$ of the feature extractors 42 and models (Speech Model Sets 1-$n$) stored in the speech database 44. The likelihood calculators 45 calculate likelihoods using Hidden Markov Models (HMMs), for example. Outputs of each of the likelihood calculators 45 are processed using a combination rule 46 to output a final decision (I) on the class of the signal.

Categories are determined via a clustering algorithm that searches for phoneme classes with similar variances in the cortical space. Based upon the category-specific low variance regions that were discussed above, fifty English phoneme classes were divided into n=12 different phonemic categories following the categorization method described above. Each phoneme class may be denoted by $w_j$, where the set of all phonemes is $C=\{w_1, w_2, \ldots, w_N\}$ and N is the total number of phoneme classes. Each category has its own low variance filter followed by dimension reduction by PCA. These categories were used to produce n feature vectors $x_1, \ldots x_n$, from the cortical response, and train a phoneme recognizer (HMM likelihood calculator 45) for each feature vector, resulting in n recognizers with parameters $$\Lambda \triangleq \{\square_1, \ldots, \square_n\}$$

that produce likelihoods $P(x_k|w_j)(1 \leq k \leq n, 1 \leq j \leq N)$. The likelihoods are combined using a maximum a posteriori probability (MAP) decision rule to make a final recognition decision.

$$\operatorname*{argmax}_{w_i \in C} P(w_i \mid x_1, \ldots, x_n, \square_1, \ldots, \square_n) =$$

$$\operatorname*{argmax}_{w_i \in C} \frac{p(x_1, \ldots, x_n \mid w_i, \Lambda) P(w_i \mid \Lambda)}{p(x_1, \ldots, x_n \mid \Lambda)} =$$

$$\operatorname*{argmax}_{w_i \in C} P(w_i \mid \Lambda) \prod_{j=1}^{n} p(x_j \mid w_i, \Lambda) = \operatorname*{argmax}_{w_i \in C} P(w_i \mid \Lambda) \prod_{j=1}^{n} p(x_j \mid w_i, \square_j)$$

where the following conditions are assumed:

$$p(x_1, \ldots, x_n \mid w_i, \Lambda) = \prod_{j=1}^{n} p(x_j \mid w_i, \Lambda) = \prod_{j=1}^{n} p(x_j \mid w_i, \square_j)$$

(conditional independence)

$$P(w_i \mid \Lambda) = \frac{1}{|C|}$$

(uniform priors).

As done in the category-independent case discussed in previous sections, certain phoneme classes were folded together to result in a final classification of 38 phonemes. The resulting recognition ratios are significantly better than the category-independent case, especially under low signal-to-noise ratios.

Table 2 shows speech recognition rates (%) using three different methods under varying SNR. "MFCC" indicates a single conventional speech recognizer using the MFCC feature type. The "category-independent features" case indicates a single speech recognizer using a single feature set extracted from the auditory model, as described in previous sections. "Multiple category-dependent features" indicates the final results from the multiple-recognizer system using category-dependent features described above.

TABLE 2

| Method/SNR | Clean | 20 dB | 15 dB | 10 dB | 5 dB |
|---|---|---|---|---|---|
| MFCC | 59.7 | 50.8 | 44.7 | 36.0 | 24.7 |
| Category-independent features | 53.4 | 52.5 | 50.2 | 44.8 | 34.6 |
| Multiple (12) category-dependent features | 58.8 | 57.8 | 56.4 | 52.8 | 44.0 |

Thus, apparatus and methods have been disclosed that provide for automatic pattern recognition using category dependent feature selection. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Pattern recognition apparatus for classifying an arbitrary input signal into one of N known classes, comprising:
   an analyzer for processing the arbitrary input signal to generate a set of representation values corresponding to the input signal;
   a plurality of phoneme recognizers coupled to the analyzer, each phoneme recognizer recognizing a distinct category of phonemes, wherein each distinct category of phonemes comprises one or more classes of phonemes;
   a plurality of likelihood processors that respectively process outputs of the plurality of phoneme recognizers to produce likelihood values that are indicative of the class membership of the input signal; and
   a combination rule processor for processing outputs of the plurality of likelihood processors to make a final decision regarding the class of the input signal.

2. The apparatus recited in claim 1 wherein the analyzer comprises:
   early auditory processing for generating an intermediate representation in the peripheral auditory response, followed by central auditory processing that generates a dimension-expanded encoding of the early auditory response.

3. The apparatus recited in claim 1 wherein each phoneme recognizer comprises:
   a low variance filter for retaining category-specific data points conjectured to encode the most relevant cognitive information pertaining to the corresponding category, and;
   a principle component analysis processor for selecting and reducing dimensions of the filter output to a feature vector.

4. The apparatus recited in claim 3 wherein each phoneme recognizer includes a high-activation filter prior to the principle component analysis processor for retaining category specific data points conjectured to be robust toward undesirable interference or noise.

5. The apparatus recited in claim 1 wherein the phoneme recognizers comprise Hidden Markov Models.

6. The apparatus recited in claim 1 wherein the combination rule processor implements a maximum a posteriori probability decision rule.

7. The apparatus recited in claim 1 wherein the analyzer comprises early auditory processing for generating an intermediate representation, and central auditory processing for generating a dimension-expanded encoding of the auditory response.

8. The apparatus recited in claim 1 wherein the analyzer processes a speech input signal and wherein the phoneme recognizers identify predetermined phonemes in the response values corresponding to a respective category of speech.

9. A pattern recognition method comprising:
processing an input signal to generate representation values corresponding to the input signal;
identifying predetermined phonemes in the representation values corresponding to a respective category using a distinct phoneme recognizer for each category of phonemes, wherein each category of phonemes comprises one or more classes of phonemes;
processing the predetermined phonemes to produce likelihood values that are indicative of the class membership of the input signal; and
processing outputs of the plurality of likelihood processors to classify the input signal.

10. The method recited in claim 9 wherein processing the input signal comprises:
processing a speech input signal;
early auditory processing for generating an intermediate representation in the peripheral auditory response; and
central auditory processing for generating a dimension-expanded encoding of the auditory response.

11. The method recited in claim 9 wherein the predetermined phonemes are identified by:
processing spectral values using a low variance filter to retain category-specific data points conjectured to encode the most relevant cognitive information pertaining to the corresponding category, and;
processing the filter output with a principle component analysis processor to reduce the data to a feature vector.

12. The method recited in claim 11 further comprising high-activation filtering the auditory response values to retain category-specific data points that are robust toward interference.

13. The method recited in claim 9 wherein the phonemes are compared with speech models using Hidden Markov Models.

14. A pattern recognition method comprising:
processing an input signal to produce phoneme-category-dependent feature sets;
using a distinct phoneme recognizer to evaluate each phoneme-category-dependent feature set against category-dependent statistical models to produce a plurality of class-dependent likelihoods, wherein each phoneme category comprises one or more classes of phonemes; and
combining all class-dependent likelihoods to form a final score for decision on the identity of the unknown class.

15. The method recited in claim 14 wherein processing the input signal comprises:
processing the speech input signal to produce an early representation of the signal;
transforming the early representation by a plurality of functional mapping thereby expanding the dimensionality of the representation; and
selecting a plurality of phoneme sets from the expanded representation according to a set of prescribed criteria corresponding to the set of pre-defined categories resulting in a plurality of category-dependent phonemes.

16. The method recited in claim 14 wherein, in the evaluating step, the phonemes are compared with a plurality of speech models using statistical methods for each pre-defined category.

17. The method recited in claim 16 wherein class-dependent likelihoods are formed by combining all likelihoods evaluated from matching the input category-dependent phonemes with the corresponding category-dependent statistical models.

18. The method recited in claim 14 wherein a final identity decision on the input signal is produced by associating its identity with the highest of all class-dependent likelihoods.

19. The method recited in claim 14 wherein predetermined phonemes are identified using a maximum a posteriori probability decision rule.

20. The method recited in claim 14 wherein the input signal comprises a speech input signal and wherein predetermined phonemes are identified in the representation values that correspond to a respective category of speech.

* * * * *